(12) United States Patent
Ehrensvärd et al.

(10) Patent No.: US 7,170,409 B2
(45) Date of Patent: Jan. 30, 2007

(54) TAMPER EVIDENT PACKAGING

(75) Inventors: Jakob Ehrensvärd, Täby (SE); Stina Ehrensvärd, Täby (SE); Leif Eriksson, Upplands Väsby (SE); Fredrik Einberg, Stockholm (SE)

(73) Assignee: Cypak AB, Stockholm (SE)

( * ) Notice: Subject to any disclaimer, the term of this patent is extended or adjusted under 35 U.S.C. 154(b) by 14 days.

(21) Appl. No.: 10/794,408

(22) Filed: Mar. 5, 2004

(65) Prior Publication Data
US 2005/0011163 A1    Jan. 20, 2005

Related U.S. Application Data

(60) Provisional application No. 60/452,447, filed on Mar. 6, 2003.

(51) Int. Cl.
*G08B 1/08*    (2006.01)
(52) U.S. Cl. ............ 340/539.26; 340/539.13; 340/540; 340/541; 340/568.1; 340/572.1; 340/825.49
(58) Field of Classification Search ......... 340/539.26, 340/539.13, 539.19, 540, 541, 568.1, 572.1, 340/572.3, 572.7, 572.8, 825.49, 825.69, 340/825.72
See application file for complete search history.

(56) References Cited

U.S. PATENT DOCUMENTS

| | | | |
|---|---|---|---|
| 5,237,307 A * | 8/1993 | Gritton | 340/572.1 |
| 5,506,566 A | 4/1996 | Oldfield et al. | |
| 5,675,319 A | 10/1997 | Rivenberg et al. | |
| 5,999,091 A * | 12/1999 | Wortham | 340/431 |
| 6,304,182 B1 * | 10/2001 | Mori et al. | 340/572.1 |
| 6,624,760 B1 * | 9/2003 | Kinzel et al. | 340/870.11 |
| 2002/0067264 A1 * | 6/2002 | Soehnlen | |
| 2004/0145520 A1 * | 7/2004 | Richardson et al. | |

FOREIGN PATENT DOCUMENTS

EP    1 122 698    5/2002

* cited by examiner

*Primary Examiner*—Hung Nguyen
(74) *Attorney, Agent, or Firm*—Renner, Otto, Boisselle & Sklar, LLP

(57) ABSTRACT

A packaging and a method for monitoring a packaging (10) of a disposable material in a chain of logistics. As an integral part of the packaging, the packaging has an electronic module (12) comprising electric energy supply means, data processing means, data storage nonvolatile memory means for storing information related to the packaging, time keeping means, and data transceiver means for transmitting and receiving said information in communication with a host computer (30). The electronic module also has sensor means (14, 20) for detecting a changed physical condition of the packaging and for signaling information representing said changed physical condition to the electronic module (12) to be stored in the memory means together with a notation of time from the time keeping means.

19 Claims, 2 Drawing Sheets

TAMPER EVIDENT PACKAGING

RELATED APPLICATION DATA

This application claims the benefit of U.S. Provisional Application No. 60/452,447 filed Mar. 6, 2003, which is hereby incorporated herein by reference in its entirety.

FIELD OF THE INVENTION

The present invention is concerned with secure and tamper evident packaging. Specifically, the invention is directed to a packaging of a disposable material and a method for monitoring the packaging particularly during shipment in a chain of logistics.

BACKGROUND OF THE INVENTION

Damage of goods in transportation is a major problem in the field of logistics. When a shipment is received in a damaged condition, there are usually no possibilities to track when the damage occurred, which turns the question of liability into an open question.

Further, intrusion and tamper events, such as illegal opening and/or modification of the content of the shipment are major concerns when handling valuable or sensitive goods. Theft, where valuable items are removed and stolen from the shipment is one aspect and another is illegal modification of a shipment's content. If a receiver claims that a shipment was not received in an expected condition, the sender cannot resolve if the receiver fraudulently claims that a theft or damage is due to an event in the logistics chain.

Another aspect of logistics is concerns about a shipment's contents and origin at time of arrival to the receiver. The origin and contents of a shipment is normally identified by an address label, which generally cannot not be verified and authenticated by the receiver.

Rising concerns about possible hazardous contents of alien shipments, where contents may include explosives, poison, biological agents etc. poses a major threat for organizations and employees at time of arrival.

Traditional means of ensuring the integrity and authenticity of a shipment include different types of sealing, where a tamper event can be visually detected at time of arrival. Holograms, lacquer sealing, security printing and other traditional methods of ensuring an item's authenticity is generally not strong enough to withstand today's sophisticated methods of counterfeiting and fraud.

Automation of logistics typically include means machine readable labels, such as bar codes, data matrix codes, RFID-tags etc., where information about the shipment can be read and processed by a host computer system. Current solutions generally provide little or no means of active authentication of the label itself. Any attempt to illegally copy, modify or move the label should be detected as an integrity violation.

In summary, it would be desirable to be able to verify the origin, integrity and authenticity of the shipment at time of arrival to the receiver in an automated, highly secure and dependable way. In the case of an integrity violation, it would be desirable to timestamp the event; enabling tracking where in the logistics chain the event occurred.

OBJECTS OF THE INVENTION

It is an object of the present invention to provide a device and a method capable of monitoring a packaging electronically and its unbroken integrity. Another object is to enable a receiver of a packaging to verify the authenticity and integrity of the shipment at arrival.

SUMMARY OF THE INVENTION

In one aspect of the invention, a packaging of a disposable material, in operative connection and as an integral part of the packaging, has an electronic module comprising electric energy supply means, data processing means, data storage nonvolatile memory means for storing information related to the packaging, time keeping means, and data transceiver means for transmitting and receiving said information in communication with a host computer; and sensor means for detecting a changed physical condition of the packaging and for signaling information representing said changed physical condition to the electronic module to be stored in the memory means together with a notation of time from the time keeping means.

Accordingly, the present invention is concerned with a shipment process, comprising a packaging being sent from a sender to a receiver. The packaging is typically a box, parcel, envelope or any similar container used to hold and protect a shipment being delivered. The packaging is typically made of disposable packaging material, such as cardboard, paper, plastics etc., and is at the time of manufacture prepared with an electronic module and printed sensors. The electronic module is electrically connected to the printed sensors. The printed sensors are typically continuous traces printed with conductive ink directly onto the packaging material, or on a laminated polymer film. The design of said printed traces is made so any damage to the packaging material causes a change in the electrical properties of the trace, which can be detected by the electronic module. Each detection is stored as an alarm event, which is stored together with a timestamp for later processing.

The basic principle for detecting the integrity of the packaging relies on continuous monitoring of the resistance of the printed traces. In a simplified form, it would be sufficient to monitor if a trace is broken or not. A continuous trace is then considered a non-tampered packaging and a broken trace a tampered packaging. But this simplified approach would make the system less secure, as an opponent could possibly understand the design and layout of the conductive traces. Such an opponent could then bypass a trace with an external conductor and then open the packaging without detection. In contrast, if the resistance of the traces is measured as an analog value, any change in resistance can be considered to be a second level of alarm event. However, the analog measurement approach must take in account the possible natural changes in resistance, due to aging, humidity, temperature and other sources of drift, which could potentially trigger a false alarm. By printing additional reference traces, the relative change in resistance between the traces, which are to be monitored, and the reference traces gives a more reliable measurement and minimizes the risk of false alarms.

The printed sensors can also extend over areas with recesses, which are designed to break more easily than corresponding continuous area of packaging material. Such areas, when present in closing lids or flaps with adhesive, makes it more difficult for an opponent to avoid breaking traces when illegally opening the packaging.

Further, by at least partial, preparing the substrate prior to printing with a varnish, which gives excellent adhesion to the substrate, but gives moderate to low adhesion to the printed traces, enables the traces to break or degrade more easily when tampered. In combination with the recesses mentioned above, the sensitivity of the detection of the conductive traces can easily be tailored to fit a particular application.

An additional feature involves detection of consecutive events on a single channel, such as opening and closing of a lid flap. The design mentioned above, with a continuous trace, which breaks when the packaging is opened, does not allow detection of multiple openings and closings. For example, courier shipments may require inspection by customs and therefore must allow at least one legal opening during the transport process. If a trace would break in that case, no detection of intrusion would then be possible after the trace was broken.

The detection feature relies on a capacitive interface printed on the packaging material. A closed flap forms a capacitive element, which when closed have a relatively high capacitance, as the plates of the capacitive element are in close proximity relative each other. When opened, the distance between the plates increases, which leads to a sharp decrease in capacitance. This change is used to detect if the flap is open or closed. If tampered, either by an attempt to short circuit the capacitive plates, or by breaking them, makes a significant change in capacitance, which can be detected and used to generate different levels of alarms.

The electronics module, comprising a microprocessor, including analog measurement means, processing means, time keeping means, memory means, communication means and power supply means, continuously monitors the property of the sensor means. Changes in the sensor means, considered as an alarm condition, is regarded as an event. Each event is recorded and stored in the memory means together with a timestamp maintained by the time keeping means.

Each electronic module holds a unique identifier, typically a linear numeric sequence, assigned to the module at the time of manufacturing. The identifier is used to uniquely identify an individual packaging within a known collection of packages.

The communication means, comprising a radio telemetry transceiver, is used to exchange information with a host computer system when placed in proximity to a host transceiver, connected to said host computer system.

Initiated by the host computer system, an encryption key can be generated, either as a key pair when using asymmetric encryption, or a single key when using symmetric encryption. The appropriate key can be transmitted from the host computer system to the electronic module and stored in its memory means. The memory means is organized in such a way, so the encryption key only can be stored and not retrieved using the communication means.

The host computer system holds information about individual shipments, such as description of contents, address of receiver, stock number etc. Said information can be transmitted to the packaging, using the communication means, where it is stored in the memory means. The host computer system can later retrieve said stored information, using the communication means. In order to prevent potential sensitive information from being retrieved by an alien host computer system, the information stored in the memory means can be encrypted using a suitable encryption algorithm. Any opponent retrieving information from a electronic module does not have the secret key used for decryption, making the received information useful for the desired receiver(s) only.

The authenticity of a packaging is verified by the host computer system by a challenge-response mechanism. Typically, a challenge consists of a large sequence of random bits, generated by the host computer system, which is transmitted to the electronic module, using the communication means. The processing means of the microprocessor is used to perform a cryptographic operation on the challenge and the unique identity of the electronic module. The result is then transmitted back to the host computer system, using the communication means. The host computer system, when initiated by a valid challenger, holds a list of unique identities and its corresponding keys, can then verify the received response to determine if the packaging is authentic.

Although described as a host computer system, the system also works without having a single networked host computer system. As long as the sender can supply the receiver with a valid encryption and/or decryption key for reading encrypted data and to verify a challenge-response to the packaging, the system works equally well in an offline scenario. A preferred method would involve an extended usage of a specific key or key pair for each relationship between a sender and a receiver. Any time a receiver gets a shipment from a claimed sender, the receiver can authenticate the claimed identity and sender by using the key for the specific sender in question. Said key could, when received, be stored in a database or any other form of media at the receiver's computer used to retrieve information from received shipments. The same scheme would apply when reading encrypted information from shipments. The exchange and maintenance of encryption keys could involve an appropriate state-of-the-art scheme for that purpose.

In applications where the temperature must be within a specific range, such as transportation of certain types of food, pharmaceuticals, chemicals, etc., a temperature sensor may be included in the electronic module. Continuous monitoring and recording of the ambient temperature into the memory means, creates a reliable audit trail, which can be retrieved and checked at time of the shipment's arrival to the receiver.

In summary, the invention described above, introduces a powerful and flexible platform for monitor a shipment in a logistics chain. By continuous monitoring of critical parameters, a reliable audit trail is generated, which can be further signed using cryptographic methods, to verify the authenticity of the information and the shipment itself. Disputes between a sender and receiver and cases of non-repudiation can be resolved with a higher precision.

DESCRIPTION OF THE PREFERRED EMBODIMENT

Figure 1:
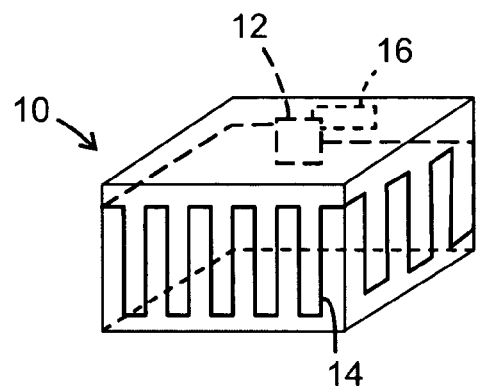
FIG. 1 shows diagrammatically a secure package according to the invention.

The preferred embodiment comprises a packaging for a shipment (FIG. 1) more precisely a cardboard parcel 10. The packet is printed with a plurality of traces 14 (all traces not shown for clarity in the FIG. 1), using electrically conductive ink to form an integral part of the package. The traces extend over all areas of the parcel. If a physical damage occurs which ruptures the cardboard, the conductivity of at least one of the traces is significantly changed. An integrated Electronics Module (EM) 12, also attached to the pack-age to form an integral part thereof, continuously monitors the conductivity of the traces. Any significant change in conductivity is considered an alarm event, which is stored in a memory in the EM 12. In order to compensate for drift in the electric conductivity in traces, a reference trace 16 is included. Rather than measuring the absolute value of the resistance of traces 14, the relationship between the trace to be measured 14 and the reference trace 16 gives a more reliable reading.

The printed traces 12, 16 are preferably printed using carbon-graphite based ink in a thermoplastic resin. Apart from the benefit of using low-cost carbon ink, the relatively high resistance of carbon-based inks, makes relative changes easier to detect.

Figure 4:
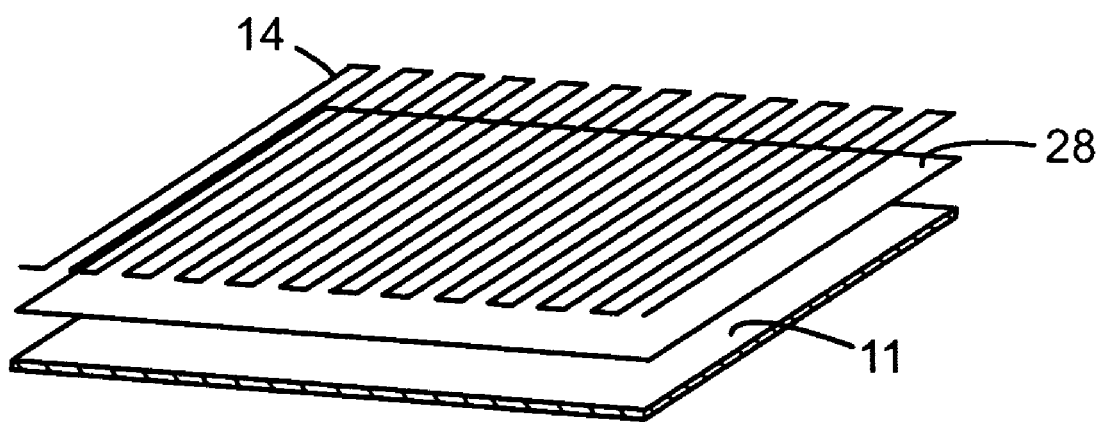
FIG. 4 is a view illustrating an embodiment where conductive traces are applied with low adherence to a packaging.

As previously mentioned and indicated on FIG. 4, between the printed traces 14 and a corresponding face 11 of the package there can be a adhesive 28, such as a varnish layer that has a lower adhesion to the package than to the conductive traces 14.

Figure 2:
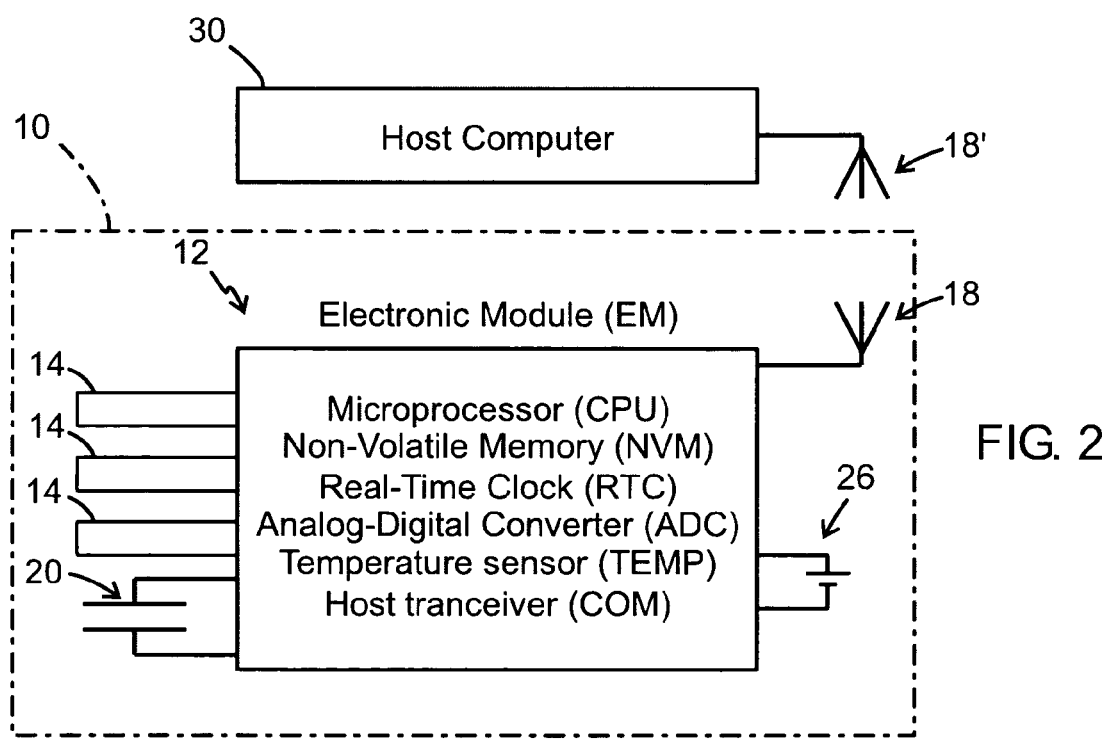
FIG. 2 is a diagrammatical representation of electronic components of the invention.

The EM 12 can be a detachable electronic module, made of standard electronic components, comprising functionality shown in FIG. 2. In the preferred embodiment, the functionality of the EM 12 is integrated into an Application Specific Integrated Circuit (ASIC). The ASIC is mounted on a small plastic film carrier, which is attached to the substrate of the packaging material, using adhesive. The adhesive is preferably an electrical conductive heat-activated glue, but favorable results have also been achieved using anisotropic pressure sensitive adhesive, conductive in the Z-axis only. This design allows a low-cost solution to make the sensor and detection system an integral part of the packaging. The low-cost solution allows the customer to dispose of the packaging or keep the packaging for extended periods, without need to introduce a recycling system.

The conductive trace design described above allows detection of a single event only. When broken, the trace 14 cannot detect additional closings and openings. For special purposes, such as a parcel that needs to be inspected by authorities, such as customs officials, a single detection of this allowed opening and closing, would allow any opponent to affect the shipment during the final transport to the receiver.

Figure 3A:
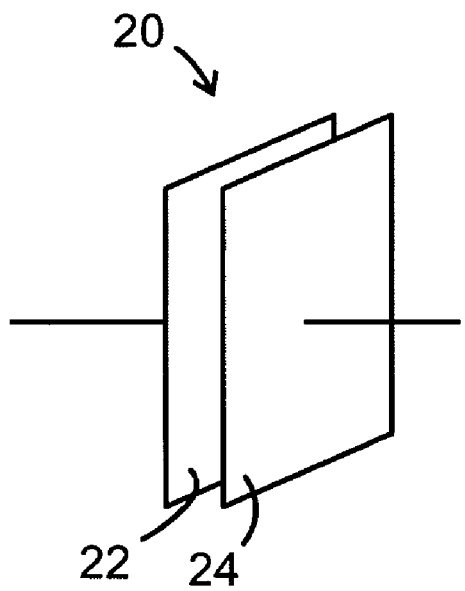
FIG. 3 shows diagrammatically use of capacitive elements for detecting repeated opening of a package.
Figure 3B:
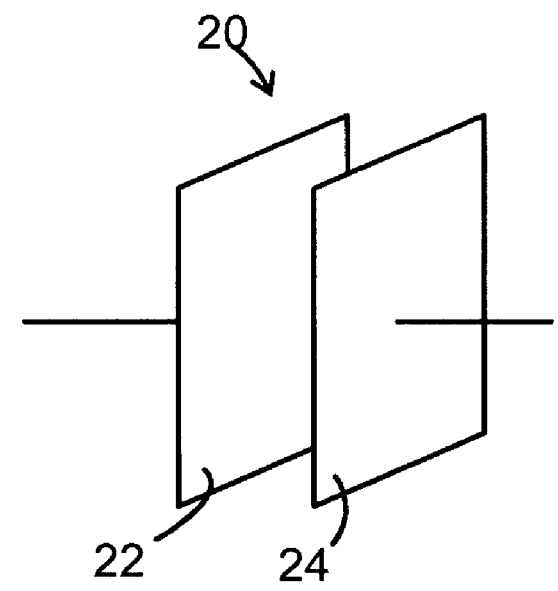

By printing a planar patch area using conductive ink on each of two facing sides of the packaging material, such as present on a lid flap, a capacitive element 20 (FIG. 3A, 3B) is formed. The design of the packaging together with the design of the capacitor patches can be configured so that a capacitance maximum is achieved when the lid is closed, as is diagrammatically shown in FIG. 3A. When the lid is opened, as shown in FIG. 3B, the distance between the capacitive patches 22, 24 increases and the capacitance decreases. With this embodiment it is possible to detect of multiple openings of a package.

As is indicated in FIG. 2, integrated into the electronic module 12 is a temperature sensor, which gives an analog output signal proportional to the temperature of the silicon chip. When mounted in a packaging material, the temperature of the chip can be considered equal to the temperature of the packaging. By continuously monitoring and storing the temperature, a temperature profile of the shipment can be followed from the sender to the receiver.

Communication with a host computer system 30 (FIG. 2) is performed using the printed antenna 18, 18' (not shown in FIG. 1). The preferred embodiment relies on a capacitive coupling patch-antenna system as described in U.S. Pat. No. 6,615,023. An inductive coupling telemetry method, such as 13.56 MHz Radio-Frequency Identification (RFID) would add some benefits, but would inevitably lead to a higher cost for integration of a tuned metallic loop antenna.

Information sent from a host system can be encrypted using either symmetric encryption, such as DES, 3-DES or AES, or asymmetric encryption, such as RSA. Only a valid receiver in possession of the appropriate key for decryption can read the information retrieved from the packaging.

The sender can supply the receiver with the appropriate decryption key, using any state-of-the-art key exchange and management protocol, by courier mail, e-mail or any other secure form of transportation.

The same mechanism applies for packet authentication, where a key stored by the sender in the EM is used by the receiver to verify that a claimed identity is authentic.

1. The receiver retrieves the identity ID of a received packaging.
2. The receiver retrieves the identity of the sender from the packaging.
3. The receiver retrieves the appropriate encryption key K for the claimed sender from a local database.
4. The receiver generates a long random number S, typically 96 bits.
5. S is sent as a challenge to the packaging.
6. The packaging encrypts S together with the packaging identity and sends back the result as the response, R.

$$R = E_K(S \| ID)$$

7. The receiver decrypts R. If the decrypted response matches S and ID, the shipment is considered to be authentic.

A full scenario describes a secure packaging P, being shipped from sender A to receiver B, using a courier company C. When B receives P, B wants to be assured that P really comes from A, as claimed, and further, that P has not been compromised or damaged after being sent from A.

A wants to be assured that a shipment has arrived to B, and that B have accepted it.

B wants to be assured that a shipment is authentic, intact and uncompromised before even accepting it from C at the time of delivery.

All parties wants to be able to resolve any conflict if, when and then implicitly where a damage or tamper event has occurred.

The protocol is described as:
1. A loads P with desired contents.
2. A seals P, by physically closing the packaging and attaches an appropriate adhesive sealing on P.
3. A retrieves and stores P's unique identity ID.
4. A generates an encryption key K, which is stored in the packaging.
5. A sends an identity string to the packaging, identifying the sender.
6. A "arms" the packaging by entering an initial timestamp and enables continuous monitoring of the state of packaging.

7. A handles P to C.
8. A notifies B that a shipment with identity ID and key K has been shipped.
9. C delivers P to B.
10. Before B accepts the delivery, B checks the package authenticity by verifying ID and K.
11. B checks the packaging integrity by retrieving the integrity log, which is decrypted using key K. Any damage, opening or excessive temperature may cause B to reject the shipment from A and handle it back to C. The dispute over the rejected delivery is then to be resolved between A and C.

A further enhancement to the protocol described above can be added in order to avoid the condition of B denying to having received P from C.

Prerequisites:
1. A generates an asymmetric key pair, $K_{AE}$ and $K_{AD}$, for encryption and decryption respectively.
2. A publishes $K_{AD}$ as its official key for signature verification of a shipment.
3. B generates an asymmetric key pair, $K_{BE}$ and $K_{BD}$, for encryption and decryption respectively.
4. B publishes $K_{BD}$ as its official key for signature verification of a shipment.
5. C generates an asymmetric key pair, $K_{CE}$ and $K_{CD}$, for encryption and decryption respectively.
6. C publishes $K_{CD}$ as its official key for signature verification of a shipment.

The protocol is described as:
1. A signs the shipment, where P generates a random number $S_A$, which is signed by A, using $K_{AE}$. The result, $D_A$ is stored together with $S_A$, in P, and the event is timestamped in P. Once written to P, $S_A$ and $D_A$ cannot be altered.
2. A handles over P to C.
3. C verifies the integrity of P and presence and authenticity of $S_A$ and $D_A$ using $K_{AD}$.
4. C decides to accept P. C signs the shipment, where P generates a random number $S_C$, which is signed by C, using $K_{CD}$. The result, $D_C$ is stored together with $S_C$, in P, and the event is time-stamped in P. Once written to P, $S_C$ and $D_C$ cannot be altered.
5. A verifies the presence and authenticity of $S_C$ and $D_C$ using $K_{CD}$.
6. The liability for the packaging is now in the hands of C.
7. C delivers P to B.
8. C verifies the integrity of P and presence and authenticity of $S_A$ and $D_A$ using $K_{AD}$.
9. B decides to accept P. B signs the reception of P, where P generates a random number $S_B$, which is signed by B, using $K_{BE}$. The result, $D_B$ is stored together with $S_B$, in P, and the event is timestamped in P. Once written to P, $S_B$ and $D_B$ cannot be altered.
10. C verifies the presence and authenticity of $S_B$ and $D_B$ using $K_{BD}$.
11. The liability for the packaging is now in the hands of B.

The protocol described above now marks clear steps in the liability of the shipment. Any dispute over missing items, tamper attempts or transport damages can be resolved. The presence of qualified digital signatures may allow disputes to be resolved in court.

What is claimed is:

1. A packaging of a disposable material comprising, in operative connection and as an integral part of the packaging:

an electronic module comprising:
   electric energy supply means,
   data processing means,
   data storage nonvolatile memory means for storing information related to the packaging,
   a unique packaging identifier,
   time keeping means, and
   data transceiver means for transmitting and receiving said information in communication with a host computer; and
sensor means comprising electrically conductive elements printed to faces of the packaging, for detecting a changed condition comprising an analog change in impedance of the conductive elements when breaking the integrity of the packaging and for signaling information representing said changed condition to the electronic module to be stored in the memory means together with a notation of time from the time keeping means.

2. The packaging according to claim 1, wherein said electrically conductive elements comprise electrically conductive traces, wherein said change in impedance comprises changing the conductivity by rupturing a conductive trace.

3. The packaging according to claim 2, wherein said electrically conductive traces are attached to said faces of the packaging, said conductive traces having variable adhesion to the substrate, said faces being attached by an adhesive, covering said conductive traces, said traces designed to, at least partially, rupture when said adhesive being subjected a destructive force.

4. The packaging according to claim 1, wherein said electrically conductive elements comprise electrically conductive traces, wherein said changed condition comprises a change in capacitance by conductive patches being moved relative to each other.

5. The packaging according to claim 1, wherein said sensor means further comprises a temperature sensor for detecting a changed condition, wherein said changed condition is a changed temperature.

6. The packaging according to claim 1, further comprising an identity of a sender stored in the data storage nonvolatile memory means.

7. The packaging according to claim 1, further comprising encrypted information stored in the data storage non-volatile memory means, for verifying an authenticity of the packaging by the host computer or a receiver of the package by a challenge-response mechanism.

8. A system for monitoring a packaging of a disposable material in a chain of logistics, comprising a host computer and a packaging according to claim 1.

9. A method of monitoring a packaging of a disposable material in a chain of logistics, comprising:
   assigning a unique identifier to an electronic module integral with the packaging;
   applying a printed pattern of electric conductive material on faces of said disposable material for forming sensors capable of detecting a changed condition comprising an analog change in impedance of the conductive material when breaking the integrity of the packaging;
   repeatedly transmitting and receiving electric signals to and from said sensors to detect the change;
   registering information including a unique packaging identifier and the changed condition together with a point in time when it occurred in the etectronic module; and
   transmitting said information from said electronic module to a host computer.

10. The method of claim 9, further including registering initial information in said electronic module representing the impedance of the packaging in an initial stage of a chain of logistics.

11. The method of claim 9, further including registering said initial information in said electronic module through a wireless transceiver in said packaging.

12. The method of claim 11, wherein said transceiver is a capacitive transceiver.

13. The method of claim 9, further comprising storing an identity of a sender in the data storage nonvolatile memory means.

14. The method of claim 9, further comprising storing encrypted information in the data storage nonvolatile memory means, for verifying an authenticity of the packaging by the host computer or a receiver of the package by a challenge-response mechanism.

15. A packaging of a disposable material comprising, in operative connection and as an integral part of the packaging:
  an electronic module comprising:
    an electric energy supply,
    a data processor,
    a data storage nonvolatile memory that stores information related to the packaging,
    a unique packaging identifier,
    a time keeper, and
    a data transceiver that transmits and receives said information in communication with a host computer; and
  a sensor comprising electrically conductive elements printed to faces of the packaging, that detects a changed condition comprising an analog change in impedance of the conductive elements when breaking the integrity of the packaging and that signals information representing said changed condition to the electronic module to be stored in the memory together with a notation of time from the time keeper.

16. The packaging according to claim 15, wherein said electrically conductive elements comprise electrically conductive traces, wherein said change of in impedance comprises changing the conductivity by rupturing a conductive trace.

17. The packaging according to claim 16, wherein said electrically conductive traces are attached to said faces of the packaging, said conductive traces having variable adhesion to the substrate, said faces being attached by an adhesive, covering said conductive traces, said traces designed to, at least partially, rupture when said adhesive being subjected a destructive force.

18. The packaging according to claim 15, wherein said electrically conductive elements comprise electrically conductive traces, wherein said changed condition comprises a change in capacitance by conductive patches being moved relative to each other.

19. The packaging according to claim 15, wherein said sensor further comprises a temperature sensor for detecting a changed condition, wherein said changed condition is a changed temperature.

* * * * *